United States Patent
Okamoto et al.

(10) Patent No.: US 12,399,079 B2
(45) Date of Patent: Aug. 26, 2025

(54) DEVICES AND METHODS FOR MEASURING THE AMOUNT OF FREQUENCY MODULATION

(71) Applicant: Nippon Telegraph and Telephone Corporation, Tokyo (JP)

(72) Inventors: Tatsuya Okamoto, Musashino (JP); Daisuke Iida, Musashino (JP); Yusuke Koshikiya, Musashino (JP); Nazuki Honda, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 170 days.

(21) Appl. No.: 18/034,754

(22) PCT Filed: Nov. 2, 2020

(86) PCT No.: PCT/JP2020/041014
§ 371 (c)(1),
(2) Date: May 1, 2023

(87) PCT Pub. No.: WO2022/091401
PCT Pub. Date: May 5, 2022

(65) Prior Publication Data
US 2023/0400379 A1  Dec. 14, 2023

(51) Int. Cl.
  G01M 11/00   (2006.01)
  G01D 5/353   (2006.01)
  H04B 10/071  (2013.01)

(52) U.S. Cl.
  CPC ..... *G01M 11/3172* (2013.01); *G01D 5/35358* (2013.01); *H04B 10/071* (2013.01)

(58) Field of Classification Search
  CPC ........ H04B 10/071; G01M 1/02; G01M 1/31; G01M 1/3109; G01M 1/3145; G01M 1/3172; G01M 1/319; G01L 1/24; G01L 1/241; G01L 1/242; G01K 11/32; G01K 11/3206; G01K 11/3213; G01K 11/322; G01K 11/324; G01D 5/353;
  (Continued)

(56) References Cited

U.S. PATENT DOCUMENTS 4,569,588 A * 2/1986 Nishiwaki ............... G01J 9/04
                                                      356/28.5
7,208,722 B2 * 4/2007 Goto ..................... G01M 11/333
                                                      250/227.19
(Continued)

FOREIGN PATENT DOCUMENTS

JP  2019-211309        12/2019
WO  WO-2019235232 A1 * 12/2019 ............ G01D 5/353

OTHER PUBLICATIONS

Jiang et al., "Long-distance frequency transfer over an urban fiber link using optical phase stabilization," J. Opt. Soc. Am. B, 2008, 25(12):2029-2035.
(Continued)

*Primary Examiner* — Gordon J Stock, Jr.
(74) *Attorney, Agent, or Firm* — Fish & Richardson P.C.

(57) ABSTRACT

The present disclosure relates to a frequency modulation amount measuring device that measures an optical spectral shift of scattered light at a position in an optical transmission line, and calculates a frequency modulation amount at the position, using the measured optical spectral shift.

6 Claims, 11 Drawing Sheets

(58) Field of Classification Search
CPC ........... G01D 5/35354; G01D 5/35358; G01D 5/35361; G01D 5/35364; G01J 2001/4242; G01J 2001/4238; G01J 9/00; G01J 9/04; G01J 2009/006; G01J 3/4338
See application file for complete search history.

(56) References Cited

U.S. PATENT DOCUMENTS

| | | | | |
|---|---|---|---|---|
| 8,670,673 | B2* | 3/2014 | Eiselt | H04B 10/071 398/24 |
| 8,724,101 | B2* | 5/2014 | Hotate | G01M 11/33 356/73.1 |
| 9,163,958 | B2* | 10/2015 | Zadok | G01D 5/268 |
| 9,571,189 | B2* | 2/2017 | Lin | H04B 10/071 |
| 9,983,095 | B2* | 5/2018 | Matsuura | G01D 5/35364 |
| 10,488,259 | B2* | 11/2019 | Bartels | G01J 3/433 |
| 11,047,767 | B2* | 6/2021 | Furukawa | G01D 5/35306 |
| 11,098,998 | B2* | 8/2021 | Tsuchida | G01B 9/02 |
| 11,326,981 | B2* | 5/2022 | Furukawa | G01M 11/319 |
| 11,506,521 | B2* | 11/2022 | Matsuura | G01D 5/35364 |
| 11,920,974 | B2* | 3/2024 | Okamoto | G01H 9/004 |
| 11,994,376 | B2* | 5/2024 | Okamoto | G01B 11/16 |
| 2002/0131042 | A1* | 9/2002 | Iwama | G01J 9/0246 356/328 |
| 2003/0007142 | A1* | 1/2003 | Hotate | G01M 11/333 356/73.1 |
| 2012/0057432 | A1* | 3/2012 | Hill | G01V 1/50 367/101 |
| 2014/0043614 | A1* | 2/2014 | Dhayalan | G01D 5/35354 356/445 |
| 2016/0182149 | A1* | 6/2016 | Domínguez López | H04B 10/07955 398/28 |
| 2017/0366257 | A1* | 12/2017 | Hayward | G01D 5/35358 |
| 2021/0215532 | A1 | 7/2021 | Okamoto et al. | |
| 2023/0324202 | A1* | 10/2023 | Matsuura | G01M 11/0271 356/73.1 |
| 2023/0386308 | A1* | 11/2023 | Murphy | G08B 13/186 |

OTHER PUBLICATIONS

Williams et al., "High-stability transfer of an optical frequency over long fiber-optic links," J. Opt. Soc. Am. B, 2008, 25(8):1284-1293.

Kreger et al., "High Resolution Distributed Strain or Temperature Measurements in Single- and Multi-mode Fiber Using Swept-Wavelength Interferometry, " Proc. OFS, 2006, ThE42, 4 pages.

* cited by examiner

DEVICES AND METHODS FOR MEASURING THE AMOUNT OF FREQUENCY MODULATION

CROSS-REFERENCE TO RELATED APPLICATIONS

This application is a National Stage application under 35 U.S.C. § 371 of International Application No. PCT/JP2020/041014, having an International Filing Date of Nov. 2, 2020, the disclosure of which is considered part of the disclosure of this application, and is incorporated by reference in its entirety into this application.

TECHNICAL FIELD

The present disclosure relates to a noise characteristics evaluation technique for optical fiber links.

BACKGROUND ART

To evaluate the noise characteristics of optical fiber links, there are methods suggested for measuring beats of probe light and local light that have propagated through an optical transmission line, and measuring the frequency modulation amount due to the propagation through the optical transmission line (see Non Patent Literatures 1 and 2, for example).

By the measurement methods disclosed in Non Patent Literatures 1 and 2, the measurement sensitivity of the frequency modulation characteristics is determined by optical frequency fluctuations of the laser that outputs the probe light and the local light. Since the frequency modulation characteristics of the optical transmission line are small, a laser with small optical frequency fluctuations (i.e., a small line width) is required. Furthermore, because of end-to-end measurement, only the frequency modulation of the entire optical transmission line can be measured, and the frequency modulation characteristics in a desired section in the optical transmission line cannot be measured.

CITATION LIST

Non Patent Literature

Non Patent Literature 1: H. Jiang et al., "Long-distance frequency transfer over an urban fiber link using optical phase stabilization", J.Opt.Soc.Am.B, Vol. 25, No. 12, 2008.
Non Patent Literature 2: P. A. Williams et al., "High-stability transfer of an optical frequency over long fiber-optic links", J.Opt.Soc.Am.B, Vol. 25, No. 8, 2008.
Non Patent Literature 3: S. T. Kreger et al., "High Resolution Distributed Strain or Temperature Measurements in Single- and Multi-mode Fiber Using Swept-Wavelength Interferometry", in Proc. OFS 2006, ThE42.

SUMMARY OF INVENTION

Technical Problem

The present disclosure aims to measure a distribution of frequency modulation characteristics in an optical transmission line.

Solution to Problem

A frequency modulation amount measuring device and a frequency modulation amount measuring method according to the present disclosure measures an optical spectral shift of scattered light at a position in an optical transmission line, and calculates a frequency modulation amount at the position, using the measured optical spectral shift.

Advantageous Effects of Invention

According to the present disclosure, it is possible to measure a distribution of frequency modulation characteristics in an optical transmission line.

DESCRIPTION OF EMBODIMENTS

The following is a detailed description of embodiments of the present disclosure, with reference to the drawings. Note that the present disclosure is not limited to the embodiments described below. These embodiments are merely examples, and the present disclosure can be carried out in forms with various modifications and improvements based on the knowledge of those skilled in the art. Note that components having the same reference signs in the present specification and the drawings indicate the same components.

In the present disclosure, an optical spectral shift of Rayleigh backscattered light at a desired position in an optical transmission line is measured with optical frequency domain reflectometry (OFDR), a phase change amount is calculated from the optical spectral shift, and the frequency modulation amount due to light propagation at a desired position is calculated from the phase change amount.

System Configuration According to the Present Disclosure

Figure 1:
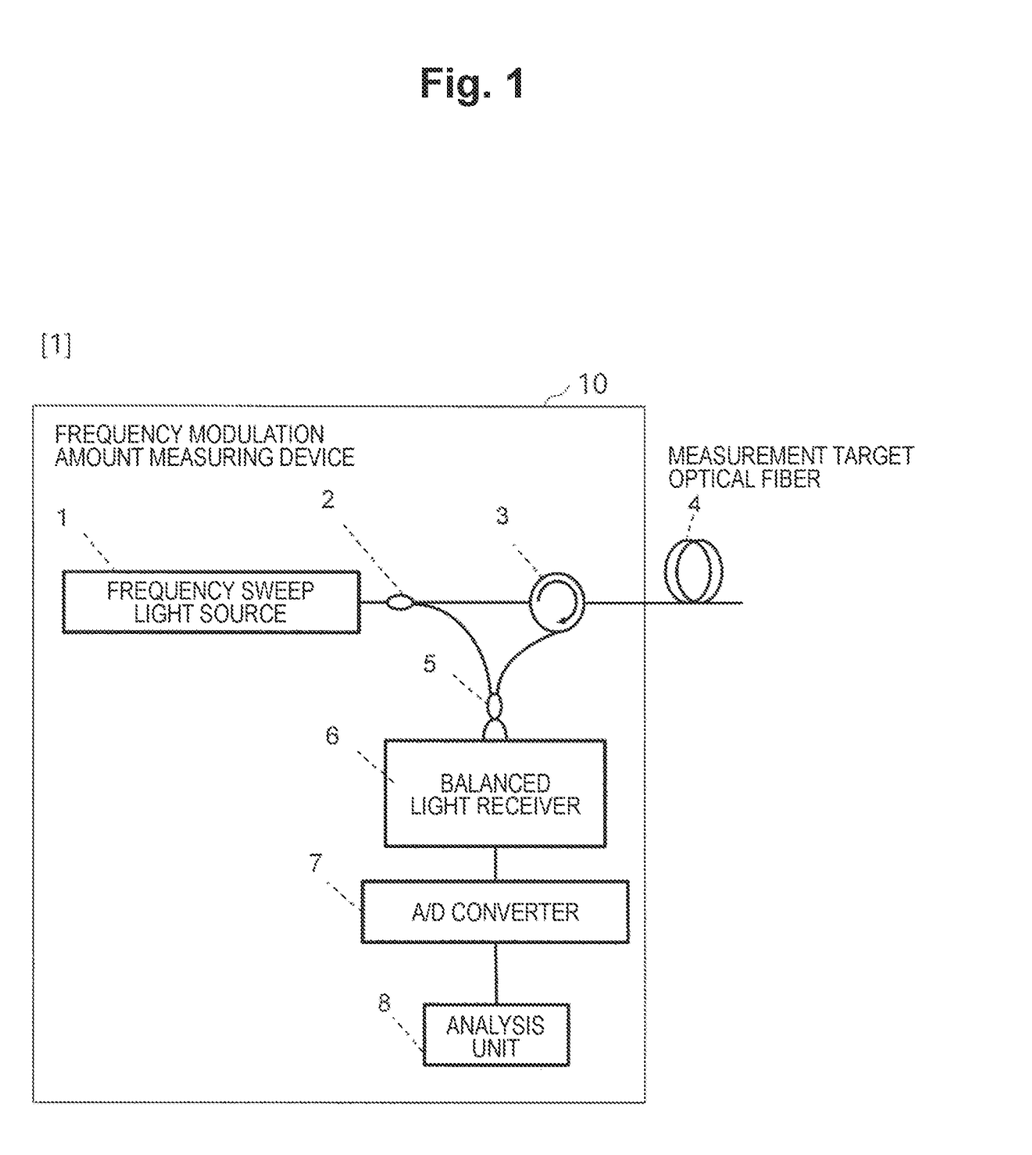
FIG. 1 illustrates an example configuration of OFDR.

FIG. 1 illustrates an example system configuration according to the present disclosure. A frequency modulation amount measuring device 10 of the present disclosure is connected to a measurement target optical fiber 4. The measurement target optical fiber 4 is connected to the optical transmission line for the measurement target. The optical transmission line, to which the measurement target optical fiber 4 is connected, includes an optical fiber, and any appropriate optical device, such as a connector to which the optical fiber is connected, may be connected thereto.

The frequency modulation amount measuring device 10 of the present disclosure has a configuration similar to OFDR. Specifically, the frequency modulation amount measuring device 10 includes a frequency sweep light source 1, a coupler 2, a circulator 3, a coupler 5, a balanced light receiver 6, an A/D converter 7, and an analysis unit 8. The analysis unit 8 of the present disclosure can also be implemented using a computer and a program, and the program can be recorded on a recording medium or be provided through a network.

The coupler 2 branches light from the frequency sweep light source 1 into a reference optical path for local light and a measurement optical path for probe light. The probe light branched into the measurement optical path enters the measurement target optical fiber 4 via the coupler 2 and the circulator 3. The coupler 5 multiplexes signal light that is the backscattered light in the measurement target optical fiber 4 and the local light branched by the coupler 2. The balanced light receiver 6 receives the interfering light multiplexed by the coupler 5. The interfering light has a beat frequency corresponding to the optical path length difference between the reference optical path and the measurement optical path. The A/D converter 7 converts an output signal of the balanced light receiver 6 into a digital signal. The analysis unit 8 analyzes the digital signal from the A/D converter 7, and measures the backscattered light waveform in the measurement target optical fiber 4. The analysis unit 8 implements a frequency modulation amount measuring method of the present disclosure using the backscattered light waveform obtained through the measurement in the measurement target optical fiber 4, and measures the frequency modulation amount at a desired position in the measurement target optical fiber 4.

Principles of the Present Disclosure

When an optical fiber expands or contracts, an optical spectral shift occurs accordingly. The expansion/contraction amount $\Delta L$ of the optical fiber and the optical spectral shift amount $\Delta v$ have the following relationship.

[Mathematical Expression 1]

$$\frac{\Delta L}{L} = \left|\frac{\Delta v}{v_0}\right| \quad (1)$$

Here, L represents the analysis length for extracting from the backscattered light waveform at the time of the optical spectral shift calculation, and $v_0$ represents the center frequency of the probe light.

On the other hand, in a case where a phase change of a phase change amount $\theta(x, t)$ occurs in the light propagating through a position x in the optical fiber at time t, a frequency modulation of a frequency modulation amount $f(x, t)$ occurs as shown below.

[Mathematical Expression 2]

$$f(x, t) = \frac{1}{2\pi}\frac{d}{dt}\theta(x, t) \quad (2)$$

Therefore, in the present disclosure, the phase change amount $\theta(x, t)$ accompanying expansion/contraction of the optical fiber is calculated with the use of the optical spectral shift amount $\Delta v$, and the frequency modulation amount $f(x, t)$ is calculated with the use of the phase change amount $\theta(x, t)$.

First Embodiment

Figure 2:
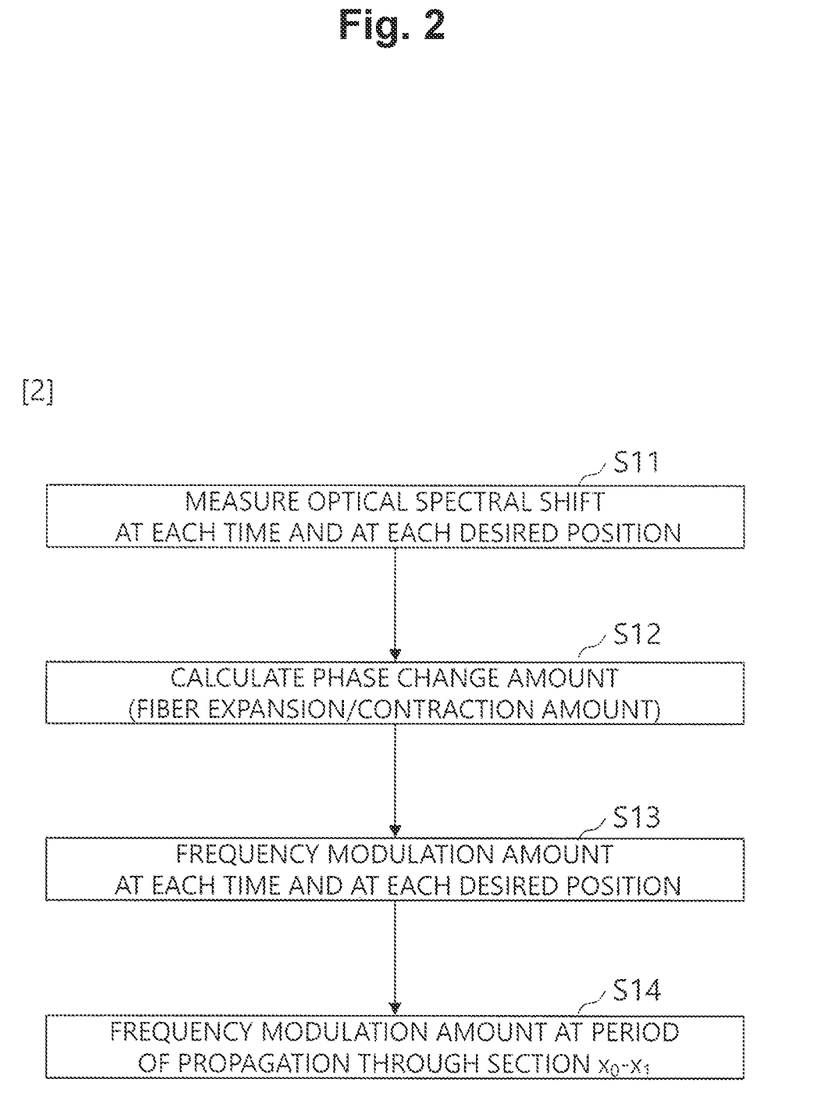
FIG. 2 illustrates an example of a method for measuring frequency modulation characteristics according to the present disclosure.

FIG. 2 illustrates an example of a frequency modulation amount measuring method according to the present disclosure. By the frequency modulation amount measuring method according to the present disclosure, steps S11 to S13 are sequentially carried out.

Step S11: the optical spectral shift $\Delta v(x, t)$ is measured with the use of the backscattered light waveform in the measurement target optical fiber 4.

Step S12: the phase change amount $\theta(x, t)$ accompanying expansion/contraction of the optical fiber is calculated with the use of the optical spectral shift $\Delta v(x, t)$.

Step S13: the frequency modulation amount $f(x, t)$ at each time t and at the desired position x is calculated with the use of the phase change amount $\theta(x, t)$.

(Step S11)

The frequency modulation amount measuring device 10 measures the backscattered light waveform in the measurement target optical fiber 4 multiple times each of the different times. For example, the reference measurement, the first measurement, and the second measurement are performed. The number of measurement times of the backscattered light waveform is freely selected as far as an optical spectral shift can be obtained, so that the backscattered light waveform may be measured twice or more at will, for example. Meanwhile, the method for measuring an optical spectral shift can be the same method as OFDR (see Non Patent Literature 3, for example).

Figure 3:
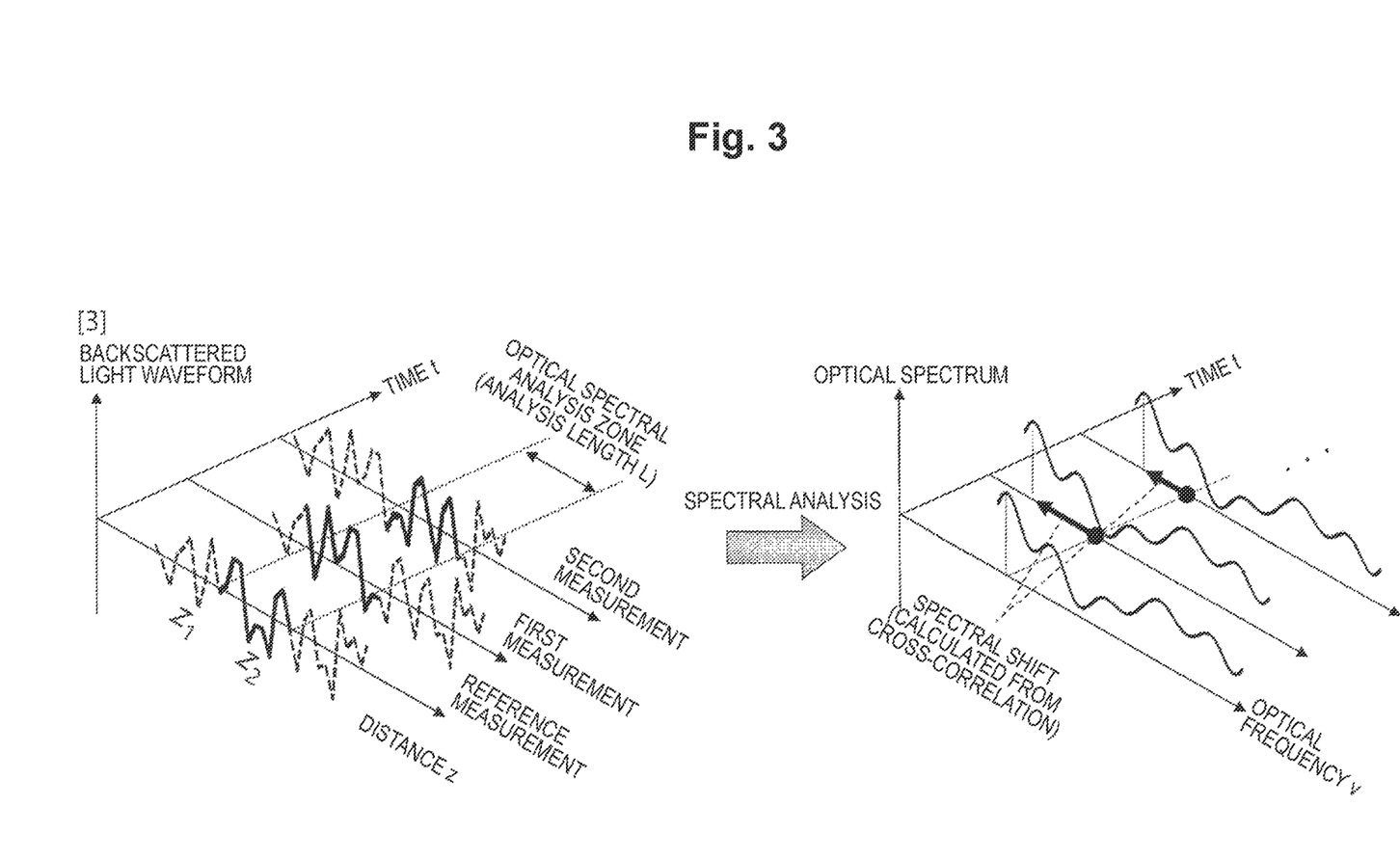
FIG. 3 illustrates an example of a spectral analysis according to the present disclosure.
Figure 4:
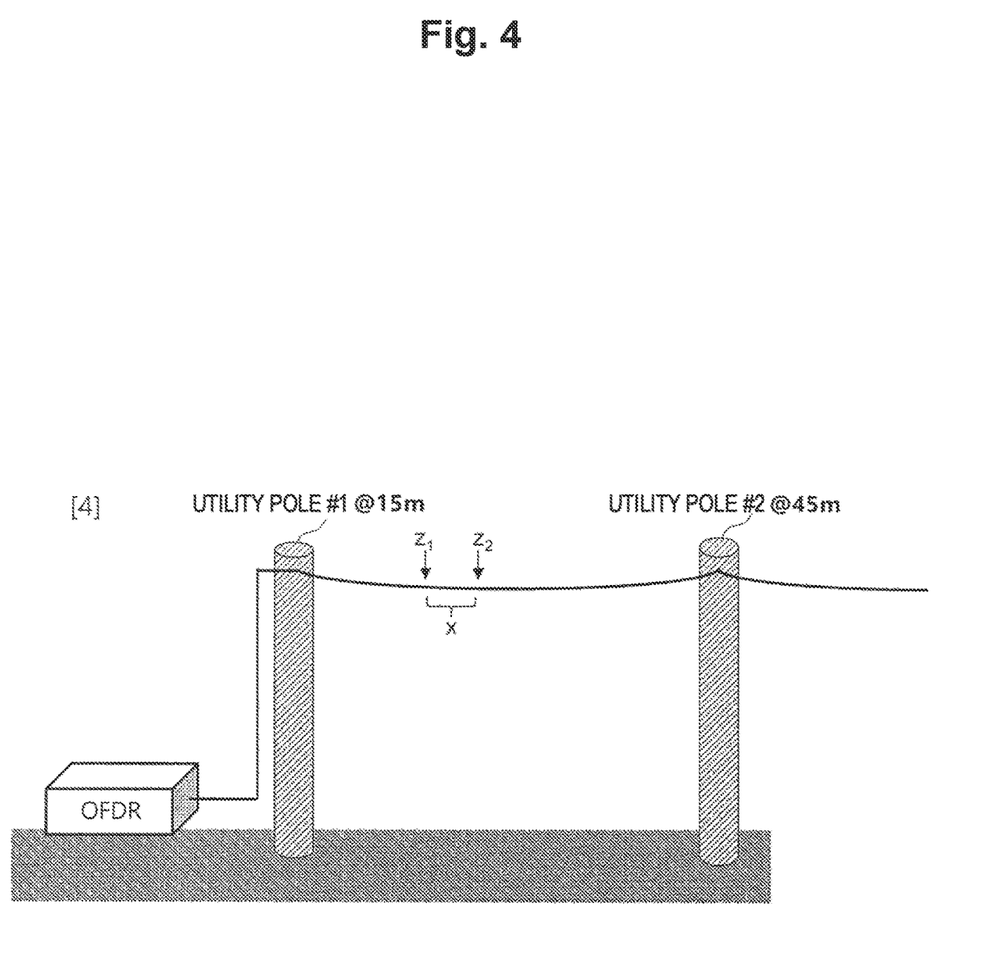
FIG. 4 illustrates an example of a measurement system where an overhead cable is used as the measurement target optical fiber.

FIG. 3 illustrates an example of a backscattered light waveform. The present disclosure shows an example in which the backscattered light waveform in the measurement target optical fiber 4 is measured three times. The backscattered light waveform is a function of a delay of the backscattered light relative to the local light. The delay of the backscattered light waveform corresponds to a distance z from the frequency modulation amount measuring device 10, and the distance between a distance $z_1$ and a distance $z_2$ corresponds to the analysis length L in Expression (1). Further, FIG. 4 illustrates an example of a measurement system where an overhead cable is used as the optical transmission line to be measured. Using the backscattered light waveform, the analysis unit 8 extracts the optical spectrum between the distance $z_1$ and the distance $z_2$, which correspond to the position x to be analyzed, and obtains the optical spectral shift $\Delta v(x, t)$ from the reference time to the time of the first measurement or the second measurement.

Figure 5:
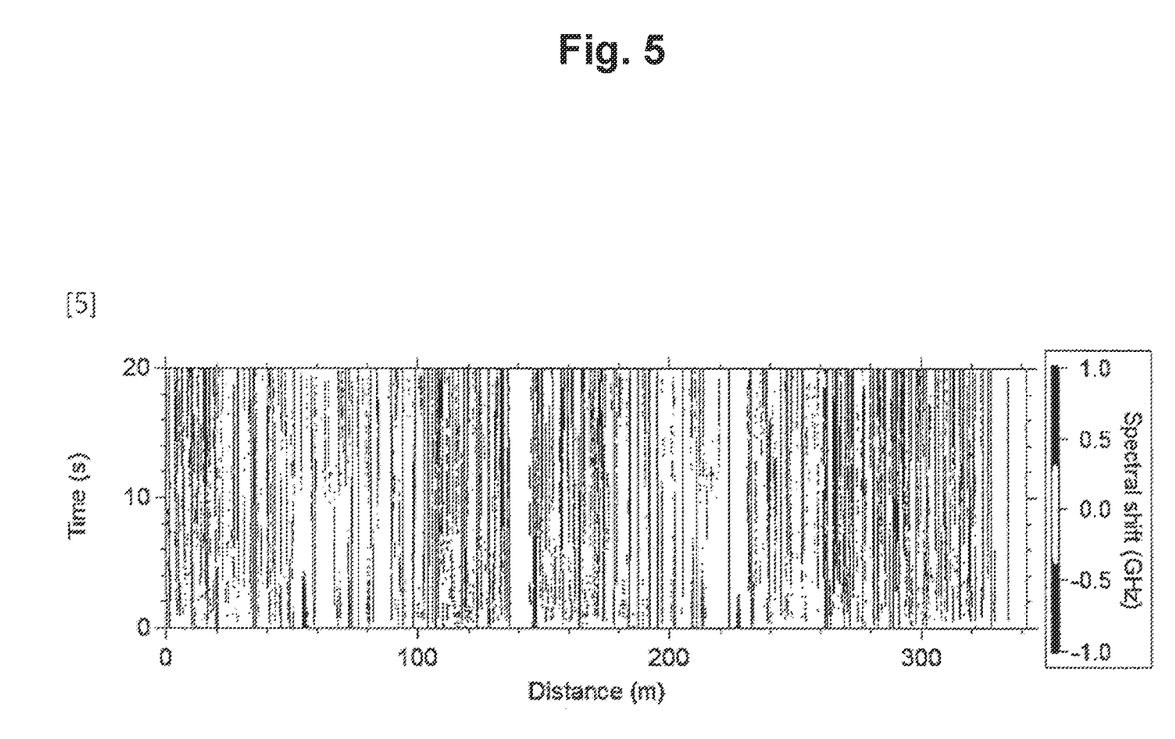
FIG. 5 illustrates an example of measurement of an optical spectral shift at each time and at any appropriate position.

FIG. 5 illustrates an example of measurement of the optical spectral shift $\Delta v(x, t)$. FIG. 5 illustrates an example in which the optical spectral shift $\Delta v$ at each position x between the distance of 0 m and the distance of 340 m at each time t between 0 seconds and 20 seconds is calculated. In this manner, the optical spectral shifts $\Delta v$ are calculated at a plurality of positions and at a plurality of times in this embodiment. The coherence length between the probe light and the local light is set to a sufficiently longer length than that of the measurement target optical fiber 4.

(Step S12)

The phase change amount θ(x, t) accompanying expansion/contraction of the optical fiber is expressed by the following expression.

[Mathematical Expression 3]

$$\theta(x, t) = \frac{2\pi n}{\lambda_0} \Delta v(x, t) \cdot \frac{L}{v_0} = \frac{2\pi n L}{c} \Delta v(x, t) \quad (3)$$

Here, n represents the refractive index of the optical fiber, $\lambda_0$ represents the center wavelength of the probe light, L represents the optical spectral analysis length, $v_0$ represents the center frequency of the probe light, and c represents the velocity of light in vacuum.

Figure 6:
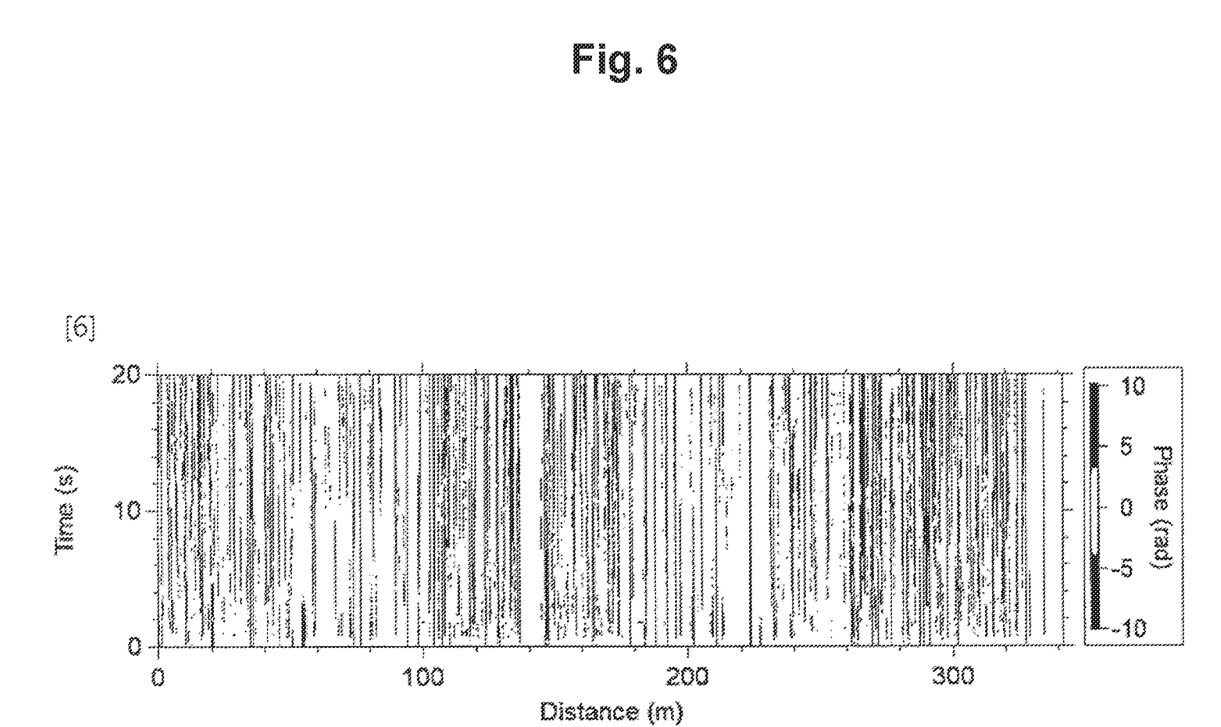
FIG. 6 illustrates an example of calculation of a phase change amount (a fiber expansion/contraction amount) at each time and at any appropriate position.

In view of this, the phase change amount θ(x, t) is calculated with the use of the obtained optical spectral shift Δv(x, t), the refractive index n of the optical fiber, and the analysis length L. FIG. 6 illustrates an example of measurement of the phase change amount θ at each time and at any appropriate position.

(Step S13)

Since the phase change amount θ(x, t) has been obtained, the frequency modulation amount f(x, t) at the position x corresponding to the distances between $z_1$ and $z_2$ can be calculated according to Expression (1) shown above.

Figure 7:
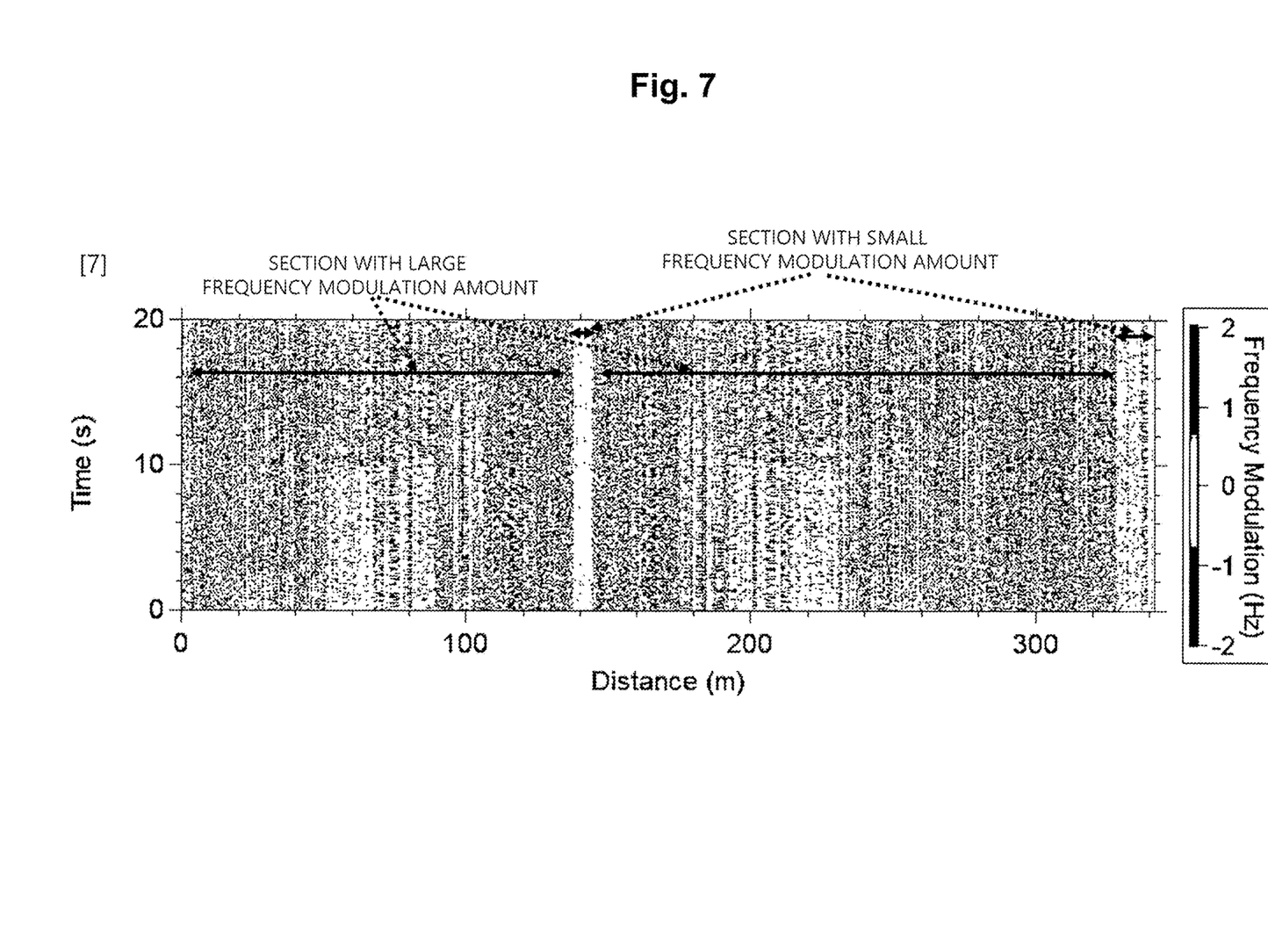
FIG. 7 illustrates an example of measurement of a frequency modulation amount at each time and at any appropriate position.

FIG. 7 illustrates an example of measurement of the frequency modulation amount f(x, t) at each time and at any appropriate position. It can be seen that the frequency modulation amount is small at any position around 140 m and in the section of 330 m to 340 m, and the frequency modulation amount is large at any position of the rest. As described above, in this embodiment, the frequency modulation amounts f(x, t) in any section including a plurality of positions x can be calculated.

As described above, in this embodiment, it is possible to measure the distribution of the frequency modulation characteristics of the measurement target optical fiber 4, without the use of a laser having small optical frequency fluctuations. Thus, in this embodiment, it is possible to evaluate the noise characteristics of the optical fiber link in the measurement target optical fiber 4 without the use of a laser having small optical frequency fluctuations, identify a section with poor characteristics, and select a transmission line with excellent frequency modulation characteristics.

Figure 8:
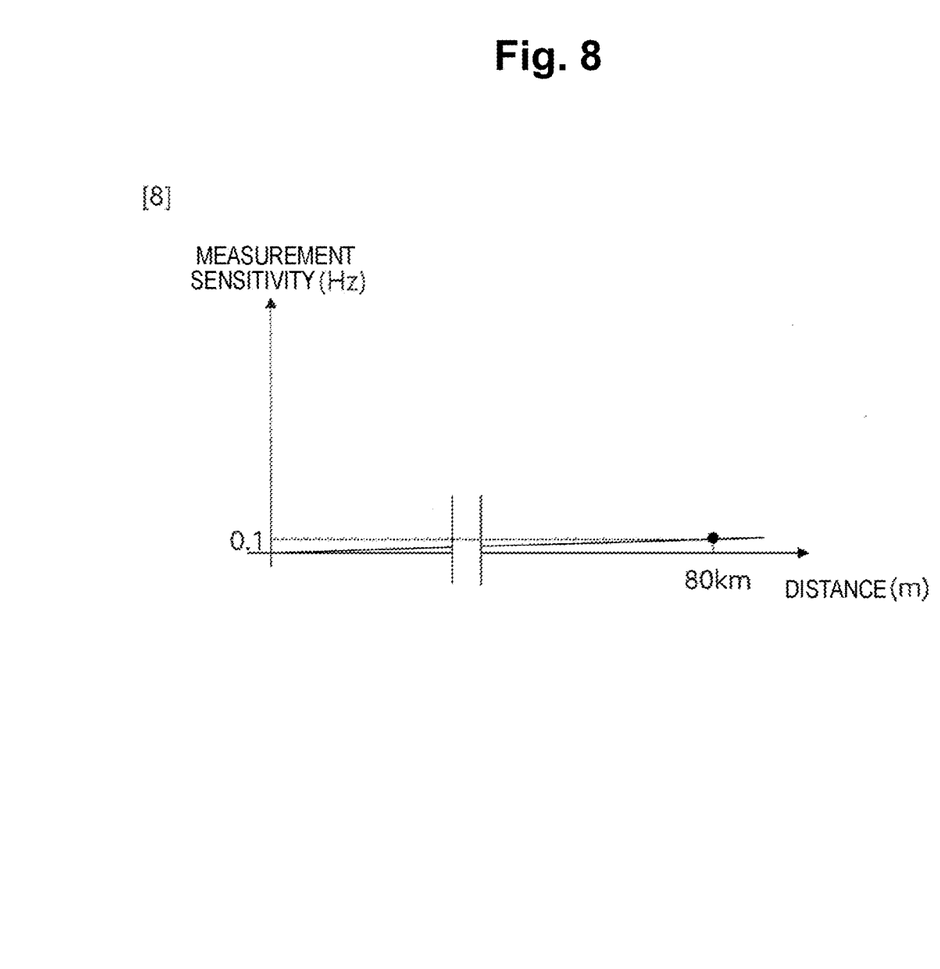
FIG. 8 is a diagram for explaining the measurement sensitivity in measurement performed by an end-to-end method.
Figure 9:
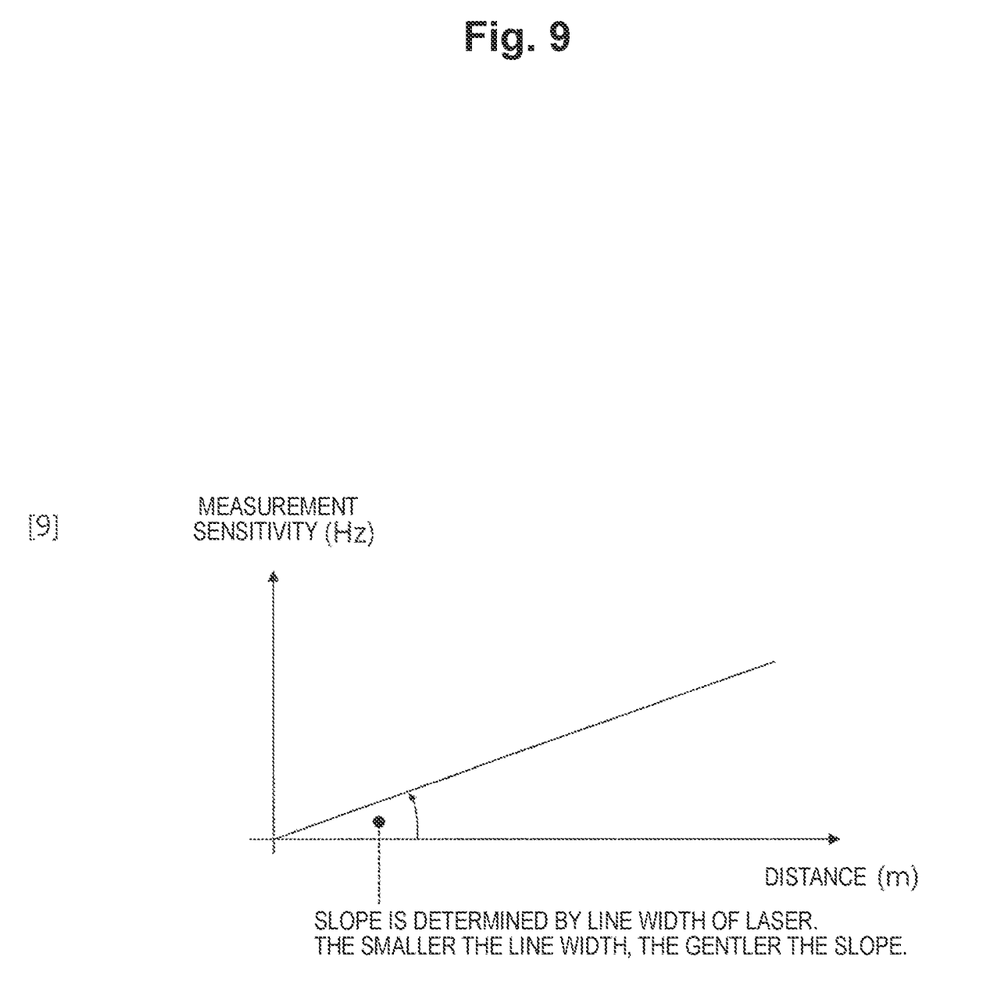
FIG. 9 is a diagram for explaining the measurement sensitivity according to the present disclosure.

FIGS. 8 and 9 illustrate an example of measurement sensitivity of OFDR. FIG. 8 shows the measurement sensitivity where measurement is performed by a conventional end-to-end method. FIG. 9 shows the measurement sensitivity according to the present disclosure. The line width (the coherence length) of the laser determines the measurement sensitivity (the measurable distance), and the end-to-end measurement requires reduction of the line width of the laser that outputs probe light and local light to prevent degradation of the measurement sensitivity due to reciprocal propagation over the length of the measurement target fiber 4. According to the present disclosure, on the other hand, the frequency modulation characteristics can be measured with high sensitivity at any distance equal to or shorter than the coherence length.

Second Embodiment

In this embodiment, step S14 is further carried out after step S13. In step S14, the frequency modulation amount $F(x_1, t)$ at the period of propagation through the section from a position $x_0$ to a position $x_1$ is calculated.

The frequency modulation amount $F(x_1, t)$ at the period of propagation through the section from the position $x_0$ to the position $x_1$ is expressed by the following expression.

[Mathematical Expression 4]

$$F(x_1, t) = \int_{x_0}^{x_1} f(x, t) dx \quad (4)$$

Figure 10:
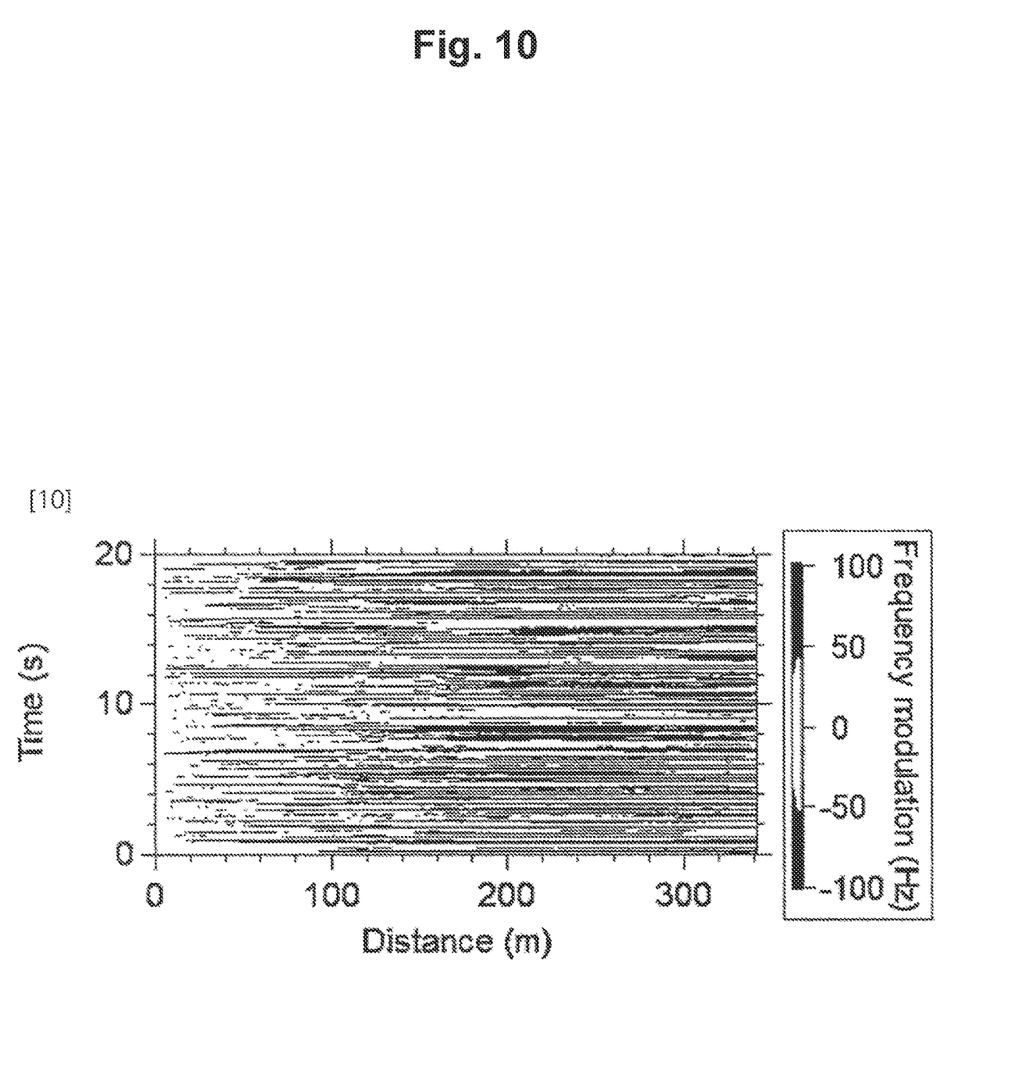
FIG. 10 illustrates an example of measurement of the frequency modulation amount at the period of propagation from the distance of 0 m to the distance of X m.

The analysis unit 8 obtains the frequency modulation amount $F(x_1, t)$, using Expression (4). FIG. 10 illustrates an example of the frequency modulation amount at the period of propagation through the section from the distance of 0 m to the distance of 340 m.

Figure 11:
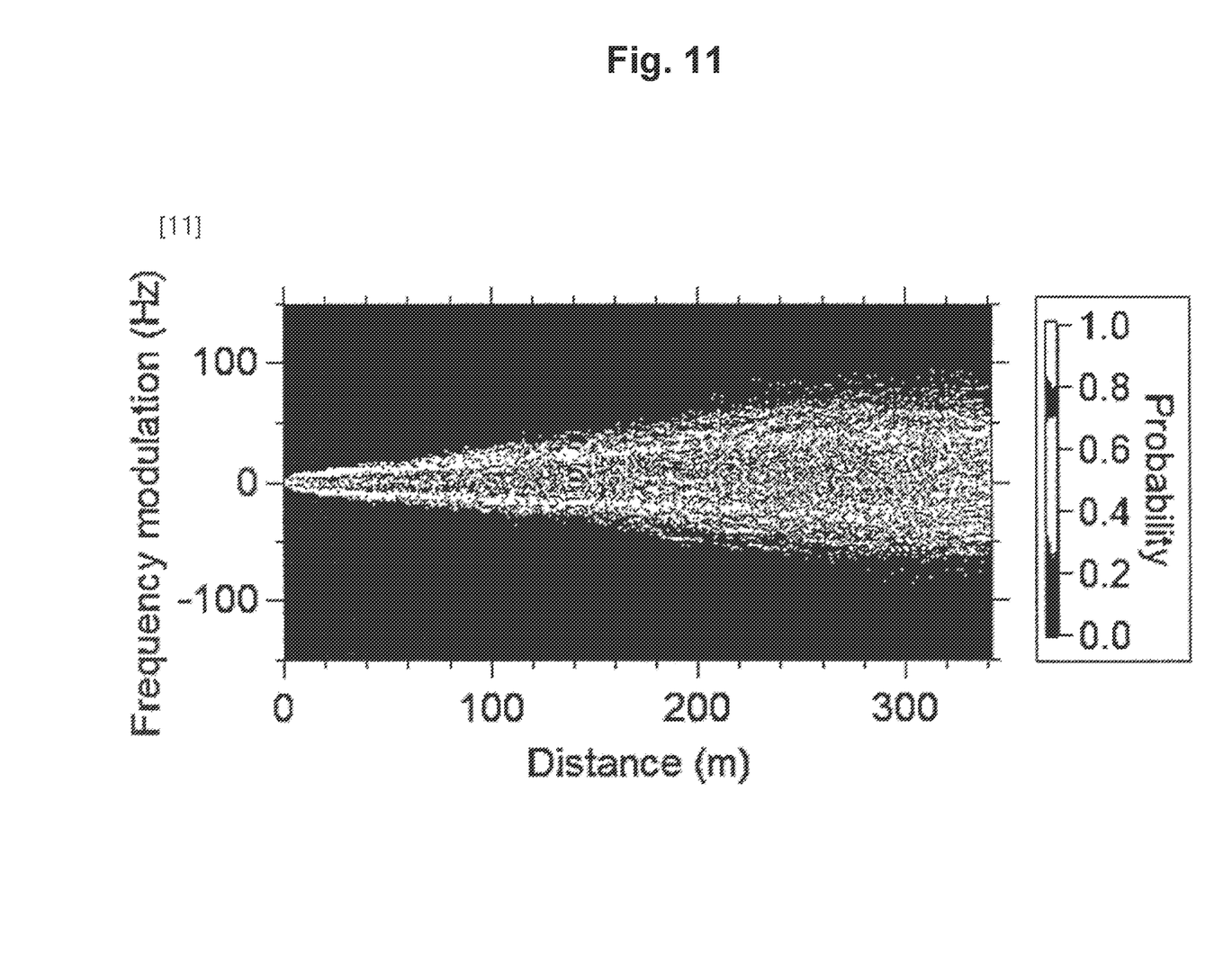
FIG. 11 illustrates an example histogram of the cumulative frequency modulation amount at the period of propagation from the distance of 0 m to the distance of X m.

The frequency modulation at each position in the section from the position $x_0$ to the position $x_1$ has no correlation, and the cumulative frequency modulation amount is the sum of random variables. Therefore, the cumulative frequency modulation draws a normally distributed histogram, in accordance with the square root of the propagation distance. FIG. 11 illustrates an example histogram of the cumulative frequency modulation amount at the period of propagation from the distance of 0 m to the distance of 340 m. Although it is difficult to see in the monochrome graph, it can be seen that the statistical characteristics of optical fiber link noise are better at a position around 140 m and in the section of 330 m to 340 m than the statistical characteristics at a position of the rest.

INDUSTRIAL APPLICABILITY

The present disclosure can be applied to the information and telecommunications industry, facility surveillance, crime prevention, and disaster monitoring.

REFERENCE SIGNS LIST

1 Frequency sweep light source
2 Coupler
3 Circulator
4 Measurement target optical fiber
5 Coupler
6 Balanced light receiver
7 A/D converter
8 Analysis unit
10 Frequency modulation amount measuring device

The invention claimed is:

1. A frequency modulation amount measuring device, comprising a processor and a non-transitory computer readable medium storing a program, wherein execution of the program causes the processor to perform operations comprising:
   measuring an optical spectral shift of scattered light at a position to be analyzed in an optical transmission line, and
   calculating a frequency modulation amount at the position to be analyzed, using the measured optical spectral shift.

2. The frequency modulation amount measuring device according to claim 1, wherein the operations further comprises
   obtaining a phase change amount at the position to be analyzed, using the measured optical spectral shift, and
   calculating the frequency modulation amount at the position to be analyzed, using the obtained phase change amount.

3. The frequency modulation amount measuring device according to claim 1, wherein the operations further comprises
measuring a backscattered light waveform in the optical transmission line multiple times, each measurement at a different time point, using optical frequency domain reflectometry (OFDR),
extracting an optical spectrum at the position to be analyzed from the backscattered light waveform obtained by the measurement; and
calculating the optical spectral shift at the position to be analyzed, using the extracted optical spectrum.

4. The frequency modulation amount measuring device according to claim 1, wherein the operations further comprises
measuring optical spectral shifts at a plurality of positions to be analyzed in the optical transmission line,
calculating frequency modulation amounts at the plurality of positions to be analyzed, and
calculating a frequency modulation amount in a section in the optical transmission line, the section including the plurality of positions to be analyzed.

5. The frequency modulation amount measuring device according to claim 4, wherein the operations further comprises
indicating the frequency modulation amount in the section in the optical transmission line by a histogram.

6. A frequency modulation amount measuring method comprising:
measuring an optical spectral shift of scattered light at a position to be analyzed in an optical transmission line, and
calculating a frequency modulation amount at the position to be analyzed, using the measured optical spectral shift.

* * * * *